(12) United States Patent
Pafford, IV et al.

(10) Patent No.: US 9,139,677 B2
(45) Date of Patent: Sep. 22, 2015

(54) COMPOSITE POLYMER EMULSION

(75) Inventors: Robert J. Pafford, IV, North Royalton, OH (US); James D. Burrington, Gates Mills, OH (US); Naser Pourahmady, Solon, OH (US); Libin Du, Jersey City, NJ (US)

(73) Assignee: Lubrizol Advanced Materials, Inc., Cleveland, OH (US)

( * ) Notice: Subject to any disclaimer, the term of this patent is extended or adjusted under 35 U.S.C. 154(b) by 609 days.

(21) Appl. No.: 13/379,232

(22) PCT Filed: Jun. 30, 2010

(86) PCT No.: PCT/US2010/040516
§ 371 (c)(1),
(2), (4) Date: Feb. 8, 2012

(87) PCT Pub. No.: WO2011/002831
PCT Pub. Date: Jan. 6, 2011

(65) Prior Publication Data
US 2012/0136109 A1    May 31, 2012

Related U.S. Application Data

(60) Provisional application No. 61/221,599, filed on Jun. 30, 2009.

(51) Int. Cl.
*C08F 220/18* (2006.01)
*C08F 2/24* (2006.01)
*C08F 210/14* (2006.01)
*C08F 212/14* (2006.01)
*C08F 220/14* (2006.01)

(52) U.S. Cl.
CPC ............ *C08F 220/18* (2013.01); *C08F 212/14* (2013.01); *C08F 220/14* (2013.01)

(58) Field of Classification Search
CPC ......... C08F 220/18; C08F 2/24; C08F 210/14
USPC ................... 526/329, 201, 203, 348.2, 348.6; 524/458, 460
See application file for complete search history.

(56) References Cited

U.S. PATENT DOCUMENTS

2010/0152380 A1 * 6/2010 Venkatesh ..................... 524/833

FOREIGN PATENT DOCUMENTS

| GB | 1126316 A * 9/1968 |
| GB | 1360685 A * 7/1974 |
| WO | 2007/113180 A1 10/2007 |
| WO | WO 2007113180 A1 * 10/2007 |

* cited by examiner

*Primary Examiner* — Kelechi Egwim
(74) *Attorney, Agent, or Firm* — Samuel B. Laferty

(57) ABSTRACT

A polymerization process to copolymerize hydrophobic ethylenically unsaturated $C_4$-$C_{28}$ olefins with polar monomers such as acrylates utilizing a polymeric support resin to stabilize the polymerization product in an aqueous media is described. The copolymer shows excellent adhesion to a variety of polymeric and/or polar substrates such as polyolefins, acrylate coatings, wood, etc.

19 Claims, No Drawings

US 9,139,677 B2

COMPOSITE POLYMER EMULSION

CROSS REFERENCE TO RELATED APPLICATION

This application claims priority from PCT Application Serial No. PCT/US2010/040516 filed on Jun. 30, 2010, which claims the benefit of U.S. Provisional Application No. 61/221,599 filed on Jun. 30, 2009.

FIELD OF INVENTION

The field is the copolymerization of non-polar $C_4$-$C_{28}$ ethylenically unsaturated aliphatic olefins with monomers containing electron withdrawing groups such as acrylates in the presence of a hydrophilic polymeric support resin. The polymerization media is preferably aqueous. The resulting copolymer is a stable emulsion or dispersion of composite polymer particles in aqueous media.

BACKGROUND OF THE INVENTION

Ethylenically unsaturated olefins without heteroatom substitution typically have low copolymerization rates with polar monomers such as acrylates. The copolymerization technology of olefins with polar monomers is reviewed in WO 03/070783 and WO 2005/054305 both owned by PPG Industries Ohio, Inc. The olefins are described as electron donating type monomers and the acrylates are described as electron accepting monomers. Styrene copolymerization with maleic anhydride is discussed in WO 03/070783 in paragraph [0002] and described as forming charge transfer complexes and resulting in some alternating sequences. Styrene is a somewhat nonpolar monomer that does readily copolymerize with acrylates and other polar monomers by free-radical mechanisms even in the absence of charge complexation. While styrene does contribute to a more hydrophobic acrylate polymer, the resulting polymers have high glass transition temperature(s) and are not useful for many applications where soft-flexible film formation is desired.

In WO 03/070783, Examples A and B of the copolymers they feed 3 or 4 different charges into a reaction vessel over several hours maintaining a temperature of 140-160° C. and pressures from 5 psi to 62 psi in Example A and 40 to 360 psi in Example B. Molecular weights were number averages of 2293 and 4274 while the weight averages were 8317 and 12,856 gram/mole. These copolymers were blended with more conventional latexes and made into curable film forming compositions.

In WO 2005/054305, Examples 1-4 were 25/20/55 w/w/w/ of isobutylene/hydroxypropyl acrylate/butyl acrylate polymerized into a copolymer by the method of the patent application. The monomers and di-t-amyl peroxide were prepared in three separate feed tanks and commingled in a feed line just prior to addition to the 5-gallon stirred reactor. The reactor was maintained between 200 and 210° C., at a pressure of 500 psi for a residence time of 16 to 25 minutes. The resulting polymer was reported to have a composition of 21 wt. % isobutylene, 27 wt. % hydroxypropyl acrylate, and 52 wt. % butyl acrylate. The copolymer was reported to have number average molecular weights between 1446 and 1699 and weight average molecular weights between 2781 and 3441 g/mole.

U.S. Pat. No. 4,820,762 is an early patent on Resin-Fortified Emulsion Polymers and Methods of Preparing the Same. The abstract expresses: The stability and physical properties of high molecular weight emulsion polymers are improved by the addition of a low molecular weight support resin during the emulsion polymerization process. The resin is soluble or dispersible in water or alkali and has a number average molecular weight between 500 and 20,000.

U.S. Pat. No. 6,020,061 is a later patent on Emulsion Polymerization Using Polymeric Surfactants. The abstract expresses: An emulsion polymerization system comprising a polymeric stabilizer, wherein the polymeric stabilizer comprises one or more alpha olefin/maleic anhydride copolymers and is present in the emulsion polymerization system in an amount greater than 0 and less than 5% by weight.

It would be desirable to copolymerize ethylenically unsaturated olefins of 4 to 30 carbon atoms with polar monomers such as acrylate monomers in large commercial reactors in aqueous media at 1 or 2 atmosphere pressure. It is also desired to make polymers over 50,000 molecular weight, preferably over 100,000 molecular weight to obtain optimum desired properties. It would be desirable to have hydrophobic olefins that copolymerize with acrylates and other polar co-monomers to form moderate to low glass transition temperature polymers for use in many ink, adhesive, and coating applications.

SUMMARY OF THE INVENTION

A composite polymeric emulsion product resulted from polymerizing in the presence of a polymeric support resin a) at least one ethylenically unsaturated aliphatic olefin with 2 or 4 to 28 carbon atoms with b) at least one ethylenically unsaturated monomer containing an electron withdrawing group, and c) optionally other ethylenically unsaturated monomers forming an aliphatic olefin copolymer comprising repeating units within the same copolymer from said at least one aliphatic olefin and said at least one monomer containing electron withdrawing group(s) in a media containing some water (also referred to as an aqueous media if appropriate) with a free radical initiator source. This polymeric reaction product is a stable emulsion of organic particles in aqueous media with good film formation properties. A film from the polymeric reaction product was found to have many desirable properties such as variable glass transition temperature, good barrier properties with respect to water and solvents, good film spreading on non-polar/low energy surfaces, good adhesion to polyolefins, and a relatively hydrophobic surface.

DETAILED DESCRIPTION OF THE INVENTION

Prior acrylate coatings provide many attractive performance properties, including good film-forming properties, balance of hard/soft (glass transition), adhesion to polar substrates (wood, metal, paper, polyester, nylon, ABS, concrete, etc.), oil resistance (with acrylonitrile added as monomer), and some moisture resistance by adding styrene monomer. Some elasticity and hydrophobicity can be produced with butadiene monomer, but this generally results in poorer UV resistance, due to residual unsaturation after polymerization. However, it is difficult to obtain other desirable properties, including moisture resistance with soft coatings, good spreading and adhesion to low surface energy substrates such as PP (polypropylene) or PE (polyethylene), resistance to polar solvents and acid/base media, barrier properties to oxygen, low coefficient of friction (COF) including soft touch without stickiness, low temperature flexibility, and resistance to dirt pickup and certain stains.

To address these latter properties, it is necessary to incorporate hydrophobic (hydrocarbon-like aliphatic olefin(s)) components into the polymer. Some conventional ways of doing this include the use of acrylate esters of long chain alcohols, such as 2-ethylhexyl acrylate, or esters of versatates, such as dodecyl versatate, the use of an olefin/acrylate compatibilizer such as polymeric surfactants and the use of a fatty acid chain transfer agent. Ethylhexyl diesters of maleic acid are also thought to impart hydrophobicity and adhesion to olefins These methods increase cost and are limited in the amount of hydrophilic component that can be incorporated.

The direct incorporation of aliphatic olefin into the acrylate polymer backbone provides the potential for a low cost, versatile method for achieving the properties of a hydrophobically modified acrylate polymer coating. Although such a process has been a subject of study by polymer chemists for many years, these efforts have met with limited success. Many of these are reviewed in U.S. Patent Application 2005/0113515 A1 (May 26, 2005), which is equivalent to WO 05/54305 described in the Background of the Invention.

A limitation of prior art methods for olefin-polar unsaturated monomer copolymerizations is that they are in general (when achieving good incorporation) performed in solution in homogeneous media resulting in low molecular weight and low physical and mechanical integrity. Most commercial acrylate polymers (without the olefin comonomers) are made by heterogeneous aqueous emulsion processes that in general yield polymers with high molecular weight and superior physical and mechanical properties. This disclosure describes a free-radical system that can co-polymerize olefins in aqueous media in conventional acrylate copolymerization reactors at more conventional acrylate polymerization temperatures and pressures.

The free radical initiator is selected from any known to those in this art, including peroxides (e.g., dibenzoylperoxide), hydroperoxides (e.g., t-butylhydroperoxide), persulfates (e.g., sodium persulfate) or azo compounds (e.g., azobisisobutyronitrile, AIBN), redox initiator systems, and mixtures of these conventional free radical initiators. The monomers (which will be described later in more detail) are independently selected from: a) an ethylenically unsaturated aliphatic alpha olefin, including but not limited to isobutylene, diisobutylene, nonene, or any other olefin containing a terminal olefin group, olefins with the beta carbon disubstituted are preferred in one embodiment, b) at least one ethylenically unsaturated monomer containing an electron withdrawing group, alternatively described as an ethylenically unsaturated monomer containing a carbonyl or nitrogen group, such as an acrylate acid or ester including acrylic acid, methyl acrylate or ethyl acrylate, 2-ethylhexylacrylate, or any normal or branched alkyl acrylate with an alcohol component of 1 to 32 carbon atoms, and c) optionally methacrylic acid or ester, styrene, acrylonitrile, vinyl chloride, vinyl amide or any other free-radically-polymerizable olefin, and/or an electron rich olefin, including vinyl ethers or esters.

DEFINITIONS

Unless otherwise indicated, the following terms have the following meanings:

As used herein, the term "wt. %" means the number of parts by weight per 100 parts by weight of a specified material/component, often on a dry weight basis, or the number of parts by weight of ingredient per 100 parts by weight of a specified composition.

As used herein, the term "molecular weight" means number average molecular weight unless otherwise specified.

"Emulsion polymerization" means a polymerization technique in which the monomers are emulsified in an aqueous medium often containing a water-soluble initiator. Polymerization occurs predominantly in micelles formed by surfactant and not in the initially formed monomer droplets. Not to be bound by theory, the monomer droplets are thought to serve as a reservoir of monomers which diffuse out to find micelles and swell them. This mechanism produces polymer particles which are significantly smaller than original monomer droplets.

"Polymer" means a chemical substance consisting of one or more repeating units characterized by the sequence of one or more types of monomer derived units (monomer residues) and comprising a simple weight majority of molecules containing at least 3 monomer derived units which are covalently bound to at least one other monomer derived unit or other reactant. Such molecules can be distributed over a range of molecular weights and can be characterized by number-average and/or weight-average molecular weights and polydispersity index.

Supported emulsion polymerization refers to polymerization systems where a polymeric support resin is used in addition to or in lieu of a low molecular weight surfactant to colloidally stabilize growing polymer particles in the emulsion. The polymeric support resins are typically have number average molecular weights from about 300; 500; 1000; 2000; or 3000 to about 15,000 or 20,000 Dalton. They typically are dispersible in aqueous media at 25° C. at concentrations from a few tenths of one percent up to 20-50 wt. % based on the total weight of the polymeric support resin and the water phase. If the polymeric support resin is non-ionic, its solubility/dispersibility not substantially affected by pH. If the polymeric support resin is anionic, is it more soluble/dispersible at pH values above 7. If the polymeric support resin is cationic, it may be more soluble/dispersible at pH values of 7 and/or below 7.

Supported (or fortified) emulsions are commonly used in paints, stains, floor polishes, leather treatment, cement formulations, architectural and paper coatings, and graphic arts. The latter includes printing inks and coatings for printing. A supported emulsion is the one in which an aqueous resin solution (the support) is used as a medium in which the second polymer is dispersed (mechanically or made in situ via polymerization to form an emulsion). The support resin adds stability to the emulsion/supported latex formed, including both shear and freeze-thaw stability, keeps the emulsion particle size small, which is important for gloss and clarity, and aids the flow characteristics of the composition, including its leveling and re-dispersibility. Support resins are typically from about 3 to 60, in another embodiment from about 4 or 5 to 20, 30, or 50 and in a third embodiment from about 5 or 8 to 20, 30 or 40 wt. % of the combined weight of the support resin and the aliphatic olefin copolymer in the composite polymer. Supported polymer emulsions are desirable in coatings and graphic arts due to the ease of use provided by the incorporation of solution resin into the polymer. Reference can be had to the following patent documents: M. Sunada et al., U.S. Pat. No. 4,179,417; W. J. Blank et al, U.S. Pat. No. 4,151,143; R. M. Boyack et al., U.S. Pat. No. 4,385,152; L. W. Lee et al., EP No. 0 338 486 A2; S.-L. Tsaur, U.S. Pat. No. 4,820,762; R. A. Kiehlbauch et al, U.S. Pat. No. 4,839,413; G. R. Frazee, U.S. Pat. No. 4,879,333; A. B. Brown et al., U.S. Pat. No. 4,916,171; R. Kuropka, EP No. 0 627 450 A1; and S. J. Chiou et al, EP No. 0 727 451 A2.

Anticipated support resins include styrene (and various alkyl substituted styrene monomers with higher or different Tg contributions)/acrylic copolymers, starches and modified starches, acrylic copolymers and hydrosols, styrene or olefin/maleic anhydride copolymers, water dispersible polyurethane etc. In one preferred embodiment, the total repeating units from acrylic and/or methacrylic monomers in the support resin comprises from about 5 to about 40 or 45 wt. %, in another embodiment from about 10 to about 40 wt. % and in a third embodiment from about 15 to about 35 wt. % of said support resin. In another embodiment, the support resin comprises from 1, 2, 3, or 10 to about 10, 20, or 30 wt. % repeating units from unsaturated copolymerizable dicarboxylic acids or anhydrides thereof. These materials are commercially available as support resins from many sources. They are typically characterized by their molecular weight, monomer type compositional details, and acid or base number. Typically, any counter-ions included will be named and extent of neutralization, if relevant, will be reported.

Within support resins further, di- and polyfunctional compounds often are used to chemically bind a support resin polymer to the particles of emulsion polymer. Examples of polyfunctional compounds include allyl-, methallyl-, vinyl-, and crotyl-esters of acrylic, methacrylic, maleic, fumaric and itaconic acids, or analogous amides, or analogous mercaptans. See, for example, European Patent Nos. EP 0 348 565 A1 or EP 0 522 791 A1; or U.S. Pat. No. 4,565,839, 4,465,803, or 4,876,313.

The ethylenically unsaturated aliphatic olefin monomer(s) that are copolymerized with the polar monomers are unsaturated olefins having in one embodiment from 2 to 30 carbon atoms, in another embodiment from 4 to 28 or 30 carbon atoms, and in third embodiment desirably 5 to 28 or 30 carbon atoms. They include branched and cyclic olefins but in preferred embodiments do not include styrenic monomers where the aliphatic nature is concluded after the first two carbon atoms of the ethylenic unsaturation. In one embodiment, the ethylenically unsaturated olefin monomer(s) do not include any atoms other than carbon and hydrogen, i.e., they are entirely hydrocarbon. In one embodiment, the formula of these molecules is $CH_2=CR'R''$ where R' is a linear or branched $C_1$ to $C_{28}$ alkyl that may be linear, branched or cyclic and R'' is hydrogen or a linear or branched alkyl as set forth for R', with the proviso that R' and R'' together have no more than 28 carbon atoms. In one embodiment, it is desirable that R'' is a linear or branched alkyl of 1 to 4 carbon atoms. Olefins where both R' and R'' are $C_1$ or higher are believed to be more co-polymerizable with the other monomers than olefins where one of R' or R'' is hydrogen. Examples of ethylenically unsaturated aliphatic olefins include butylene, isobutylene, diisobutylene, pentene, hexene, octene, dodecene and other linear and branched olefins. It is desirable that at least 5 or 10 wt. %, and in another embodiment from 5 or 10 to about 30 or 40 wt. % of the aliphatic olefin copolymer comprises repeating units from said aliphatic olefin monomer(s).

Free-Radical Polymerizable Monomers.

Examples of free radical co-polymerizable monomers which are useful in forming the copolymers of this invention include acrylic esters, methacrylic esters, unsaturated nitriles, styrenic monomers, vinyl esters, vinyl ethers, conjugated dienes, olefins, halogenated (e.g., vinyl chloride and vinylidene chloride), allyl and other monomers, and mixtures thereof. The preferred ethylenically unsaturated monomers for achieving copolymerization with the ethylenically unsaturated aliphatic olefins are those with electron withdrawing groups or including carbonyl or nitrogen containing groups such as the acrylates, ethylenically unsaturated monomers with carboxylic acid groups such as acrylic acid, nitrile monomers such as acrylonitrile, vinyl amides, etc. Desirably, the monomers with the electron withdrawing groups are characterized by the electron withdrawing group having a sigma σ (inductive component) value from 0.1 to 0.9 according to Bromilow et al., J. Org. Chem., 44, 4755 (1979). Later listed monomers that do not meet the definitions for achieving copolymerization with ethylenically unsaturated aliphatic olefins are listed as optional monomers to provide other properties to the copolymer(s).

Specific examples include acrylic esters and methacrylic acid esters having the formula I:

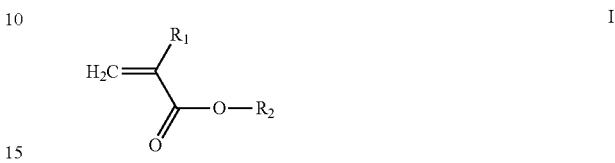

wherein $R_1$ is hydrogen or a methyl group, and $R_2$ contains about 1 to 100 carbon atoms, more typically 1 to 50 or 1 to 25 or 32 carbon atoms, and optionally, also one or more sulfur, nitrogen, phosphorus, silicon, halogen or oxygen atoms. Examples of suitable (meth)acrylate esters include methyl (meth)acrylate, ethyl(meth)acrylate, n-propyl (meth)acrylate, n-butyl(meth)acrylate, isopropyl(meth)acrylate, isobutyl(meth)acrylate, tert-butyl(meth)acrylate, n-amyl(meth) acrylate, n-hexyl(meth)acrylate, isoamyl (meth)acrylate, 2-hydroxyethyl(meth)acrylate, 2-hydroxypropyl(meth)acrylate, 4-hydroxybutyl(meth)acrylate, N,N-dimethylaminoethyl(meth)acrylate, N,N-diethylaminoethyl (meth)acrylate, t-butylaminoethyl(meth)acrylate, 2-sulfoethyl (meth)acrylate, trifluoroethyl(meth)acrylate, glycidyl(meth)acrylate, benzyl (meth)acrylate, allyl(meth)acrylate, 2-n-butoxyethyl (meth)acrylate, 2-chloroethyl (meth)acrylate, sec-butyl- (meth)acrylate, tert-butyl(meth)acrylate, 2-ethylbutyl (meth) acrylate, cinnamyl(meth)acrylate, crotyl(meth)acrylate, cyclohexyl (meth)acrylate, cyclopentyl(meth)acrylate, 2-ethoxyethyl(meth)acrylate, furfuryl (meth)acrylate, hexafluoroisopropyl(meth)acrylate, methallyl(meth)acrylate, 3-methoxybutyl(meth)acrylate, 2-methoxybutyl(meth) acrylate, 2-nitro-2-methylpropyl (meth)acrylate, n-octyl (meth)acrylate, 2-ethylhexyl(meth)acrylate, 2-phenoxyethyl (meth)acrylate, 2-phenylethyl(meth)acrylate, phenyl(meth) acrylate, propargyl (meth)acrylate, tetrahydrofurfuryl(meth) acrylate, norbornyl(meth)acrylate, acrylamide and its derivatives, and tetrahydropyranyl(meth)acrylate. Mixtures of acrylic and methacrylic acid esters may be used. The polymerized acrylic and/or methacrylic acid esters (i.e. repeating units therefrom) typically may comprise at least 5, 10, or 20 wt. % and up to 50, 75, 90 or 95 wt. % of the copolymer, in another embodiment from about 5 to 90 wt. %, in still another embodiment from 20 to 90 wt. %, in a third embodiment from 40 or 50 to about 90 wt. % depending on the amount of ethylenically unsaturated olefin desired in the aliphatic olefin copolymer. Esters similar to acrylic and methacrylic include esters of vinyl monomers have two or more carboxylic groups such as itaconic, fumaric, and maleic acids.

Unsaturated nitrile monomers include acrylonitrile or an alkyl derivative thereof, the alkyl preferably having from 1 to 4 carbon atoms, such as acrylonitrile, methacrylonitrile, and the like. Also suitable are unsaturated monomers containing a cyano group such as those having the formula II:

$$CH_2=C(R^3)CO(O)CH_2CH_2CN \qquad (II)$$

wherein $R^3$ is H or $C_nH_{2n+1}$ and n is 1 to 4 carbon atoms. Other examples of unsaturated nitrile monomers include $CH_2=C(CN)_2$, $CH_3-CH=CH-CN$, $NC-CH=CH-CN$, 4-pentenenitrile, 3-methyl-4-pentenenitrile, 5-hexenenitrile, 4-vinyl-benzonitrile, 4-allyl-benzonitrile, 4-vinylcyclohexanecarbonitrile, 4-cyanocyclohexene, and the like. Mixtures of the unsaturated nitriles may also be used. Acrylonitrile and methacrylonitrile are preferred. In some embodiments, the polymerized unsaturated nitrile monomers typically may comprise no more than about 60 wt. %, more typically no more than 20%, 15 wt. %, 10 wt. %, 5 wt. % or 3 wt. % of the copolymer.

The "styrenic monomers" useful in preparing the hydrophilic polymer(s) of this invention may be defined as monomers containing a carbon-carbon double bond in the alpha-position to an aromatic ring. For the purpose of this disclosure, styrenic monomers will be considered neither to be ethylenically unsaturated aliphatic olefins nor ethylenically unsaturated monomers with electron withdrawing groups. Notwithstanding, styrenic monomers may be included as co-monomer(s) in making the copolymers of this invention. Examples of suitable styrenic monomers include styrene, alpha-methylstyrene, tertiary butylstyrene, ortho, meta, and para-methylstyrene, ortho-, meta- and para-ethylstyrene, o-methyl-p-isopropylstyrene, p-chlorostyrene, p-bromostyrene, o,p-dichlorostyrene, o,p-dibromostyrene, ortho-, meta- and para-methoxystyrene, indene and its derivatives, vinylnaphthalene, diverse vinyl(alkyl-naphthalenes) and vinyl(halonaphthalenes) and mixtures thereof, acenaphthylene, diphenylethylene, and vinyl anthracene. Mixtures of styrenic monomers also may be used. Styrene and alpha-methylstyrene are preferred. In some embodiments where the repeating units from styrene type monomers are undesirable, the polymerized styrenic monomers typically may comprise no more than about than 80%, 60 wt. %, 40 wt. %, 20 wt. %, 10 wt. % or 5 wt. % of the copolymer.

Vinyl ester monomers derived from carboxylic acids containing 1 to 100, more typically 1 to 50 or 1 to 25, carbon atoms also may be useful in preparing the vinyl polymer of the present invention. Examples of such vinyl ester monomers include vinyl acetate, vinyl propionate, vinyl hexanoate, vinyl 2-ethylhexanoate, vinyl octanoate, vinyl pelargonate, vinyl caproate, neo esters of vinyl alcohol, vinyl laurate, vinyl versatate and the like, as well as mixtures thereof. The polymerized vinyl ester monomers typically may comprise from 0 wt. % to about 99.5 wt. % of the vinyl polymer of the present invention.

Vinyl ethers may be useful in preparing the copolymer of the present invention. Examples of vinyl ethers include methyl-, ethyl-, butyl, iso-butyl vinyl ethers and the like. In one embodiment, the polymerized vinyl ether monomers typically may comprise from 0 wt. % to about 60 wt. %, preferably from 0 wt. % to about 50 wt. %, of the vinyl polymer of the present invention.

Conjugated diene monomers containing 4 to 12 carbon atoms, and preferably from 4 to 6 carbon atoms, also may be useful in preparing the polymer of the present invention. Examples of such conjugated diene monomers include butadiene, isoprene, pentadiene, and like, as well as mixtures thereof. Butadiene is preferred. As expressed earlier, diene monomers contribute to UV light sensitivity and possibly accelerate polymer degradation under UV light. Thus, in some embodiments where UV light will be present, the copolymers have less than 50, more desirably less than 30, more desirably less than 10 or 20, and preferably less than 5 wt. % or less than 1 wt. % repeating units from diene monomers.

Olefin monomers outside one or more of the definition(s) of ethylenically unsaturated aliphatic olefins containing 4 to 30 carbon atoms may also be useful in preparing the vinyl polymer of the present invention. Examples of such olefins include ethylene and propylene, as well as mixtures thereof. Cyclic olefins may also be used such as vinyl cyclohexane, cyclopentene, cyclohexene, cyclooctadiene, norbornene, norbornadiene, pinene and like. In one embodiment, the copolymer may typically be comprised from 0 or 1 wt. % to about 50 wt. %, from 0 or 1 wt. % to about 20 or 30 wt. %, or from 0 wt. % to about 5 or 10 wt. %, of repeating units from ethylene, propylene or cyclic olefin monomers.

Ethylenically unsaturated monomers comprising fluorine, chlorine, bromine, and iodine may be useful in preparing the copolymer of the present invention. They may contain 2 to 100 carbon atoms and at least one halogen atom. Examples of such monomers include vinyl fluoride, vinyl chloride, vinyl bromide, vinylidene fluoride, vinylidene chloride, halogenated (meth)acrylic and styrenic monomers, allyl chloride and like, as well as mixtures thereof. In some embodiments, the copolymer of this invention will comprise less than 50 wt. %, more desirably less than 20 or 30 wt. % and more desirably still less than 5 or 10 wt. % of halogenated repeating units from these monomers.

In one embodiment for polymeric support resin polymerization, ethylenically unsaturated monomer(s) containing halogen (e.g., vinyl chloride) provide up to 98 mole % of the repeat units of the copolymer and the copolymer is an ethylenically unsaturated aliphatic olefin modified halogenated polymer such as olefin modified poly(vinyl chloride). In one embodiment of this vinyl chloride embodiment, the support resin in a styrene-acrylic or styrene-maleic copolymer. In another embodiment the support resin is a partially hydrolyzed poly(vinyl acetate). In another embodiment, the support resin includes a cellulosic polymer such as methyl cellulose or hydroxy-propyl-methyl-cellulose.

Polar and Hydrophilic Monomers.

Another group of monomers which are useful in preparing the copolymers of the present invention are polar monomers such as hydroxyalkyl(meth)acrylates, (meth)acrylamides and substituted (meth)acrylamides, sodium styrene sulfonate and sodium vinyl sulfonate, N-vinyl-2-pyrrolidone, N-vinyl caprolactam, 2-hydroxyethyl(meth)acrylate, 2-hydroxypropyl(meth)acrylate, 4-hydroxybutyl(meth)acrylate, (4-hydroxymethylcyclohexyl)-methyl(meth)acrylate, acrolein, diacetone (meth)acrylamide, 1-(2-((2-hydroxy-3-(2-propenyloxy)propyl)amino)ethyl)-2-imidazolidinone, N-methylol (meth)acrylamide, diallyl phosphate, Sipomer® WAM, WAM II (from Rhodia) and other urido-containing monomers, dimethylaminoethyl(meth)acrylate, and dimethylaminopropyl (meth)acrylamide, acrylic acid, methacrylic acid, crotonic acid, maleic acid, itaconic acid, citraconic acid, maleic anhydride, itaconic anhydride, citraconic anhydride, acrylamido (2-methyl propane sulfonic acid), and vinyl phosphonic acid. Mixtures of polar monomers also may be used.

Hydrophilic Monomers and Components.

Hydrophilic components (i.e., monomers, chain transfer agents, initiators) have at least one hydrophilic, ionic or potentially ionic group is optionally included in the copolymer to assist dispersion of the polymer, thereby enhancing the stability of the dispersions so made. Typically, this is done by incorporating a compound bearing at least one hydrophilic group or a group that can be made hydrophilic (e.g., by chemical modifications such as neutralization or deblocking) into the polymer chain. These compounds may be of a nonionic, anionic, cationic or zwitterionic nature or the combination thereof.

For example, anionic groups such as carboxylate, sulfate, sulfonate, phosphate, and phosphonate can be incorporated into the polymer in an inactive form and subsequently activated by a salt-forming compound, such as ammonia, organic amines and alkali metal hydroxides. Other hydrophilic compounds can also be reacted into the polymer backbone, including lateral or terminal hydrophilic ethylene oxide, the organic amines and polyamine/polyimines previously described as chain extenders for polyurethanes, pyrrolidone or ureido units.

Hydrophilic compounds of particular interest are those which can incorporate acid groups into the polymer such as ethylenically unsaturated monomers having at least one carboxylic acid group, and preferably one or two carboxylic acid groups. Examples of such monomers include acrylic acid, methacrylic acid, itaconic acid, maleic acid, maleic anhydride, fumaric acid, crotonic acid, vinyl acetic acid, mesaconic acid, citraconic acid, 2-acrylamido-2-methylpropane-sulfonic acid, styrene sulfonic acid, 2-sulfoethyl(meth) acrylate, alkali metal salts of the above acids and amine or ammonium salts thereof such as sodium allyl sulfonate, sodium 1-allyloxy-2-hydroxypropane sulfonate (COPS 1), 2-acrylamido-2-methyl propane sulfonate (AMPS), sodium dodecyl allyl sulfosuccinate (TREM-LF40), sodium methallyl sulfonate, sodium styrene sulfonate, sodium vinyl sulfonate, sodium vinyl phosphonate, sodium sulfoethyl methacrylate.

Strong acid monomers are also desirable in the copolymer. Examples of ethylenically unsaturated strong acid monomers useful according to the invention include, but are not limited to, 2-acrylamido-2-methylpropane sulfonic acid, 1-allyloxy-2-hydroxypropane sulfonic acid, vinylsulfonic acid, styrene sulfonic acid, alkyl allyl sulfosuccinic acid, sulphoethyl (meth)acrylate, phosphoalkyl(meth)acrylates such as phosphoethyl methacrylate (phosphate ester of 2-hydroxyethyl methacrylate), phosphoethyl acrylate, phosphopropyl(meth) acrylate, phosphobutyl(meth)acrylate, phosphate ester of polyethyleneglycol(meth)acrylate, phosphate ester of polypropyleneglycol(meth)acrylate, phosphoalkyl crotonates, phosphoalkyl maleates, phosphoalkyl fumarates, phosphodialkyl(meth)acrylates, phosphodialkyl crotonates, vinyl phosphonic acid (VPA) and allyl phosphate. Salts of these unsaturated strong acid monomers are also useful. Diesters and blends of monoesters and diesters of the phosphate strong acids are useful also. The term "(meth)acrylate," and the like, as used throughout means either an acrylate, or a methacrylate, or mixtures of both. In a preferred embodiment, the ethylenically unsaturated strong acid monomer is a phosphorous-containing monomer, and especially an unsaturated phosphate ester such as phosphoethyl methacrylate (phosphate ester of 2-hydroxyethyl methacrylate).

Compounds/Monomers Having at Least One Crosslinkable Functional Group.

Compounds having at least one crosslinkable functional group can also be incorporated into the vinyl polymers of the present invention, if desired. Examples of such compounds include N-methylol acrylamide (NMA), diacetone acrylamide (DAAM), acetoacetoxy ethyl methacrylate (AAEM), epoxy-containing compounds, —OH containing compounds, —COOH containing compounds, isocyanate-containing compounds (TMI), mercaptan-containing compounds, compounds containing olefinic unsaturation and the like. Mixtures can also be used.

Following polymerization of the ethylenically unsaturated aliphatic olefin with at least one ethylenically unsaturated monomer containing an electron withdrawing group, it is often desirable to reduce the volatile organic content (VOC) of the polymerization product so that downstream products from the polymer dispersion can be formulated to be compliant with various volatile organic component limitations imposed by regional governments. By VOC, according to the present invention, it is meant the sum of the residual monomers and additional volatile organic compounds (e.g., diluents and degradation products) which are determined by the chromatographic gas method. While VOC may have a different definition by different groups, a preferred definition from the *European Union Directive* 2004/42/CE for VOC emissions from varnish defines VOC as an organic compound having an initial boiling point less than or equal to 250° C. measured at a standard atmospheric pressure of 101.3 kPa. As defined hereunder; more precisely the total VOC according to the present invention is desirably lower than 600, 500, 200, 100, 20, or 10 ppm and in particular the monomers, which are substances sometimes toxicologically harmful, lower than 500, 200, 100, 50, 20, or 10 ppm. A low VOC is typically less than 500 ppm, more preferably less than 250 ppm and most preferably less than 50 ppm. There are commercial methods or technology for removing volatile organics and residual monomers such as steam stripping, coagulation and washing or drying, etc. Removing VOCs soon after polymerization also avoids more restrictive shipping and storage requirements that might be required if more significant amounts of volatile and potentially flammable organics are present in the headspace of partially filled containers, tanks, trucks, etc.

Polymeric Support Resin.

As already described, polymeric support resins are commercially available and well described by their suppliers. They can be non-ionic (utilizing water compatible non-ionic polymers such as poly(vinyl alcohol), poly(ethylene oxide), polypropylene oxide), starches, cellulose, etc.), anionic, and/or cationic to create a water compatible phase. They can be anionic utilizing the carboxyl group of a monocarboxylic acid containing repeating unit (as derived from things like acrylic or methacrylic acid) or a dicarboxylic acid containing repeat unit (as derived from things like itaconic acid or maleic anhydride). The support resins may include both ionic and non-ionic moieties such as are present in polyurethane support resins which can contain poly(ethylene oxide) solubilising moieties (either in chain or pendant) and/or anionic carboxylic acid salt groups (such as derived from dimethylolbutanoic acid or dimethylolproprionic acid). The comonomers in synthesized support resins desirably have some compatibility with the monomers to be polymerized into an emulsion. Thus acrylic esters, styrene, alkyl-substituted styrene, olefins, etc. are popular comonomers. When using support resins derived from starches or cellulosics, the material is sometimes modified to enhance solubility in water and/or create hydrophobic regions where the monomers (to be polymerized into an emulsion) would aggregate.

While not wishing to be bound by theory, it is generally anticipated that the polymeric support resins function very similarly to lower molecular weight surfactants, e.g., lauryl sulphate, in colloidally stabilizing growing emulsion particles and under some circumstances serving as the loci of the generation of a new emulsion particle. The polymeric support resin differs from its lower molecular weight counterpart in that it is more difficult (and time consuming) for the polymeric support resin to become separated from a growing emulsion particle and migrate to another growing emulsion particle. The slower migration of the polymeric support resin relative to low molecular weight surfactants is believed to contribute to enhanced colloidal stability when using polymeric support resins, better shear stability, and preventing other colloidal destabilizing events common with lower molecular weight surfactants. While in concept, lower molecular weight surfactants can often be washed off an emulsion polymer, the polymeric support resins are believed to be somewhat entangled with the polymer of the emulsion particle and thus would not be expected to wash off a support resin stabilized latex particle.

The polymeric support resins impart some sensitivity to water in products formed from the supported emulsion particles. This is a common feature with the lower molecular weight surfactants. In anionic polymeric support resins, it is typical to use weaker carboxylic acids (rather than sulfonic acids) and a fugitive amine (such as triethyl amine, ammonia, etc.) such that the resulting carboxylic acid provides significantly less water sensitivity than the alkalie salt of a sulfonic acid. The microstructure, selection of repeat units, molecular weight, method of dispersal, percent neutralization, etc. can be controlled to minimize the amount of polymeric support resin and accordingly the final water sensitivity (irrespective of ionic or non-ionic moieties) of the emulsion polymer in its final use. U.S. Pat. No. 6,020,061 discloses selection techniques for the polymeric support resin such that the total amount of support resin is controlled from greater than 0 to less than 5 wt. % based on the weight of the water, monomers, support resin, and initiator. The background of invention of that patent suggested that support resins in the prior art were typically present from about 2.5 or 5 to about 20 or 30 wt. % based on the weight of the final emulsion.

In one embodiment, at least 10 wt. % of the total polymeric support resin in an acrylic and/or methacrylic copolymer. Other support resins that can be blended with the acrylic and/or methacrylic support resin are cellulosic based support resins, partially hydrolyzed poly(vinyl acetate) (generating poly(vinyl alcohol) repeating units) support resins, starch based support resins, and/or polyurethane support resins.

Other Additives for the Polymer.

Other additives well known to those skilled in the art can be used in combination with the copolymer. Such additives include stabilizers, defoamers, antioxidants (e.g., Irganox™ 1010), UV absorbers, activators, curing agents, stabilizers such as carbodiimide, colorants, neutralizing agents, thickeners, non-reactive and reactive plasticizers, coalescing agents such as di(propylene glycol) methyl ether (DPM) and PM acetate, waxes, slip and release agents, antimicrobial agents, surfactants such as ionic and non-ionic surfactants (e.g., Pluronic™ F68-LF, IGEPAL™ CO630) and silicone surfactants, metals, salts, antiozonants, and the like.

Blends with Other Polymers and Polymer Dispersions.

The polymers of this invention can be combined with commercial polymers and polymer dispersions by methods well known to those skilled in the art.

The polymer may be applied as a dispersion in a media to form a coating, adhesive, sealant, etc. It may be applied by brushing, dipping, flow coating, spraying, rolling, etc. It may contain conventional ingredients such as solvents, plasticizers, pigments, dyes, fillers, emulsifiers, surfactants, thickeners, rheology modifiers, heat and radiation stabilization additives, defoamers, leveling agents, anti-cratering agents, fillers, sedimentation inhibitors, U.V. absorbers, antioxidants, flame retardants, etc. It may contain other polymeric species such as additional polymers in the forms of blends, interpenetrating networks, etc.

In one embodiment, the polymerization temperature is 0 to about 100 or 150° C. preferably 5 to about 95° C. and more preferably about 10 to about 90° C. In one embodiment, the reactor pressure after charging the monomers and during polymerization is from atmospheric pressure (about 1 atmosphere) to about 10 atmosphere, more desirably from about atmospheric to about 2 or 3 atmosphere. In one embodiment, it is desirable that a conventionally equipped acrylate polymerization vessel designed for use at 1 or 2 atmospheres could be used so that equipment costs would not be a deterrent to using this technology.

In one embodiment, desirably the pH of the polymerization media would be from about 1 to about 10, 11 or 12 more desirably from about 1 to about 7, more desirably from about 2 to about 5. In one embodiment, emulsifiers/dispersants/surface active molecules, to the extent necessary, would be chosen so that they performed any necessary function at the desired or selected pH.

In one embodiment, the polymerization media can be about any media that doesn't negatively interact with the monomers, initiators, and other components to the polymerization, and in particular including small or large amounts of water. Organic solvents (both polar and nonpolar) may be present but generally are not required. In one embodiment, the polymerization media is desirably at least 100 or 500 ppm or 1, 2, 5, 10, 15, or 20 to about 30, 50, 70, 80, 90 or 99 wt. % water based on the continuous media/aqueous media and any dispersed phase therein, e.g., monomers, surfactants, initiators, chain transfer agents, copolymers, etc. Water, to the extent present, can be from any source, e.g., de-ionized, distilled, city water, etc.

In one embodiment, the aliphatic olefin co-copolymers from this process desirably have a number average molecular weight in excess of 2,000; more desirably in excess of 3,000 or 5,000; and in other embodiments desirably in excess of 10,000; 25,000; 50,000; or 100,000 grams per mole. Molecular weights as stated will be determined by GPC analysis using polystyrene standards. Molecular weights from about 25,000 and higher often typical of emulsion polymerization. Typically, the weight average molecular weight of many polymers and polymerization mechanism will be about double the number average molecular weight. In one embodiment, desirably these copolymers will have a weight average molecular weight in excess of 4,000; more desirably in excess of 6,000 or 10,000; and in other embodiments desirably in excess of 20,000; 50,000; 100,000; or 200,000 grams per mole. These molecular weights may be claimed in combination with emulsion polymerization mechanisms.

The polymerization mechanism can be any of those known to the art (e.g., dispersion, emulsion, bulk, solution, etc.). In one embodiment, it is desirable for ease of handling of the polymer that the final copolymer (e.g., in aqueous media) be a dispersion that can be pumped and handled as a liquid. It is desirable that the number average particle size be below 5 microns, more desirable below 1 micron, and in some embodiments less than 800, less than 500; less than 300, or less than 200 nanometers in diameter. The particles sizes of less than 500 nanometers and below are typical of emulsion polymerization and may be claimed in combination with an emulsion type polymerization mechanism.

Typically, one wants both co-monomers and the optional co-monomers to be chemically bonded into the same polymer chain, unless one wants an interpenetrating polymer network of two separate polymers. The copolymers can have randomly inserted monomers, alternating insertion of monomers, blocky insertion of repeating units from a single monomer, etc. As one goes from blocky insertion to random to perfectly alternating insertion, the percentage of any first type of repeating unit adjacent to another type of repeating unit increases. In one embodiment, desirable at least 5, 10, 15 or 20 weight percent of the copolymer are the sum of a) repeating units from said ethylenically unsaturated olefin are covalently bonded to at least one repeating unit from said ethylenically unsaturated monomer with electron withdrawing group (or carbonyl or nitrogen containing group) with b) repeating units from said ethylenically unsaturated monomer with electron withdrawing group covalently bonded to at least one repeating unit derived from said ethylenically unsaturated aliphatic olefin. In one embodiment, desirably at least 5, 10, 15 or 20 weight percent of the repeating units from said ethylenically unsaturated monomer with electron withdrawing group are covalently bonded to at least one repeating unit from said ethylenically unsaturated olefin. Similarly, in one embodiment, desirably at least 5, 10, 15 or 20 weight percent of the repeating units from said ethylenically unsaturated olefin are covalently bonded to repeating units from said ethylenically unsaturated monomer with electron withdrawing groups.

While not wishing to be bound by theory, the mechanism by which this co-polymerization takes place is postulated to involve sequential formation of electron poor and electron rich terminal end groups on the growing polymer resulting from alternating addition of olefin and acrylate.

A unique feature of many of the examples in this invention is that generally in the NMR analysis of polymers from this process, alternating sequences of the a) ethylenically unsaturated aliphatic olefin with 4-30 carbon atoms with the b) at least one ethylenically unsaturated monomer containing an electron withdrawing group (alternately defined in some claims as an ethylenically unsaturated monomer containing a carbonyl or nitrogen group) exist in the copolymer, often along with sequences or blocks of the b) monomer. The presence of both alternating sequences of the two types of monomers and homopolymer blocks within the same reaction product seems unique. In on embodiment, it is desirable that at least 2, 5, 10, or 20 mole percent of all the repeating units in the copolymer are the sum of said a) ethylenically unsaturated aliphatic olefin with 4 or 5 to 30 carbon atoms covalently bonded to at least one of said b) at least one ethylenically unsaturated monomer containing an electron withdrawing group (alternately defined in some claims as an ethylenically unsaturated monomer containing a carbonyl or nitrogen group) combined with said b) at least one ethylenically unsaturated monomer containing an electron withdrawing group (alternately defined in some claims as an ethylenically unsaturated monomer containing a carbonyl or nitrogen group) covalently bonded to at least one of said a) ethylenically unsaturated aliphatic olefin with 4 or 5 to 30 carbon atoms. Alternatively, in another embodiment (or in combination with the limitations above characterizing said alternating sequences), at least 2, 5, 10, or 20 mole percent of all the repeating units in the copolymer are the sum of said b) at least one ethylenically unsaturated monomer containing an electron withdrawing group (alternately defined in some claims as an ethylenically unsaturated monomer containing a carbonyl or nitrogen group) covalently bonded to repeat units from monomers other than said a) ethylenically unsaturated aliphatic olefin with 4 or 5 to 30 carbon atoms (e.g., the copolymers have the specified amount of blocks of said b) at least one ethylenically unsaturated monomer containing an electron withdrawing group (alternately defined in some claims as an ethylenically unsaturated monomer containing a carbonyl or nitrogen group) not alternating with said a) a) ethylenically unsaturated aliphatic olefin with 4 or 5 to 30 carbon atoms.

The copolymer product can be used in OEM (original equipment manufacturing) plastics including automotive and consumer electronics; weatherable coatings for building and the construction industry, adhesives, textile coatings for home furnishings and automotive, printing inks and primers for flexible packaging. It may be used as a dispersion in aqueous media or precipitated to isolated the polymer (e.g., as a dry powder, bulk polymer, or slurry) and used as an additive, impact modifier, etc., for another plastics. It is particularly useful in applications requiring additional hydrophobic character in coatings, primers, inks, compatibilizers, adhesives, sealants, caulks, textile coatings, and composite materials. The copolymers could be used in personal care, pharmaceutical or pharmacologically active formulations to change the feel, viscosity, surface character, delivery mechanism, etc. of such formulations.

EXAMPLES

Abbreviations of the Chemicals Used in Examples

MMA: methyl methacrylate
EA: ethyl acrylate
nBA: n-butyl acrylate
TMP-1: 2,4,4-trimethyl-1-pentene
1-OCT: 1-octene
AO-12: 1-dodecene
AO-16: 1-hexadecene
APS: ammonium persulfate
tBHP: t-butyl hydroperoxide
SLS: sodium lauryl sulphate
SFS: sodium formaldehyde sulfoxylate
Aerosol OT-75: 75% solution of sodium dioctyl sulfosuccinate available from Cytec Industries Inc.
Carboset™ GA 2300: Aqueous solution of styrene-acrylic copolymers available from The Lubrizol Corp.
Carboset™ GA 1166: Aqueous solution of styrene-acrylic copolymers available from The Lubrizol Corp.
The analysis of the polymer latexes was preformed using the following instruments.
LsbWave 9000™ (CEM Corporation) for total solids;
Acumet Basic AB15 pH Meter (Fisher Scientific) for pH;
Brookfield Viscometer (Brookfield Engineering Laboratories, Inc.) for Brookfield viscosity, spindle 2 or 3, 3-60 rpm;
Submicro Particle Sizer Autodilute$^{PAT}$ Model 370 (NICOMP Particle Sizing System) for particle size.

Example 1

56.5 nBA/38.5 MMA/5.0 TMP-1

A monomer premix was made by mixing 15.3 grams of water, 406.8 grams of nBA, 277.2 grams of MAA, and 36.0 grams of TMP-1. Initiator was made by dissolving 7.2 grams of ammonium persulfate in 28.87 grams of water. Approximately 420.6 grams of water, 7.7 grams of 75% Aerosol OT-75 aqueous solution, and 462.9 grams of Carboset™ GA 2300 and 157.5 grams of Carboset™ GA 1166HS were charged into a 3 L reactor vessel and heated to 78° C. Initiator was then added into the reactor, followed by proportioning the monomer premix over a period of 3 hours. The temperature was raised to 82° C. and held for 1 hour after the completion of the addition, and then cooled to 65° C. A mixture of 0.51 grams of 70% t-butyl hydroperoxide, 0.24 grams of 30% SLS, and 6.12 grams of water (post initiator I) was added into the reactor at 75° C. Another mixture of 0.58 grams of SFS, and 30.38 grams of water (post initiator II) was added into the reactor at 65° C. After 30 minutes, the reaction vessel was cooled to room temperature and filtered through 100-micro cloth. A polymer dispersion of 48.1% solids was obtained with no sediment, a viscosity of 285 cps (25° C.) at a pH of 7.8. The particle size was 86 nm. All the compositions are listed in Table 1.

TABLE 1

| Charges | Reagents | Parts (grams) |
|---|---|---|
| Monomer premix | Water | 15.3 |
| | nBA | 406.8 |
| | MMA | 277.2 |
| | TMP-1 | 36.0 |
| Reactor Charge | Water | 420.6 |
| | Aerosol AT-75 | 7.7 |
| | Carboset ™ GA 2300 | 462.9 |
| | Carboset ™ GA 1166HS | 157.5 |
| Initiator | APS | 7.2 |
| | Water | 28.87 |
| Post Initiator I | tBHP | 0.51 |
| | SLS | 0.24 |
| | Water | 6.12 |
| Post Initiator II | SFS | 0.58 |
| | water | 30.38 |

Example 2

53.0 nBA/37.0 MMA/10.0 TMP-1

The polymer dispersion was made exactly the same way as in Example 1 except with different charges as listed in Table 2. The polymer dispersion has a percent solids of 47.3% by weight, an average particle size of 88 nm, and a viscosity of 420 cps (25° C.) at a pH of 7.9.

TABLE 2

| Charges | Reagents | Parts (grams) |
|---|---|---|
| Monomer premix | Water | 15.3 |
| | nBA | 381.6 |
| | MMA | 266.4 |
| | TMP-1 | 72.0 |
| Reactor Charge | Water | 420.6 |
| | Aerosol OT-75 | 7.7 |
| | Carboset ™ GA 2300 | 462.9 |
| | Carboset ™ GA 1166HS | 157.5 |
| Initiator | APS | 7.2 |
| | Water | 28.87 |
| Post Initiator I | tBHP | 0.51 |
| | SLS | 0.24 |
| | Water | 6.12 |
| Post Initiator II | SFS | 0.58 |
| | water | 30.38 |

Example 3

53.0 nBA/37.0 MMA/10.0 TMP-1

The polymer dispersion was made exactly the same way as in Example 2 except that the olefin was front-loaded in reactor charge rather than in monomer premix (see Table 3). The polymer dispersion has a percent solids of 47.6% by weight, an average particle size of 103 nm, and a viscosity of 480 cps (25° C.) at a pH of 7.9.

TABLE 3

| Charges | Reagents | Parts (grams) |
|---|---|---|
| Monomer premix | Water | 15.3 |
| | nBA | 381.6 |
| | MMA | 266.4 |
| Reactor Charge | Water | 420.6 |
| | Aerosol OT-75 | 7.7 |
| | Carboset ™ GA 2300 | 462.9 |
| | Carboset ™ GA 1166HS | 157.5 |
| | TMP-1 | 72.0 |
| Initiator | APS | 7.2 |
| | Water | 28.87 |
| Post Initiator I | tBHP | 0.51 |
| | SLS | 0.24 |
| | Water | 6.12 |
| Post Initiator II | SFS | 0.58 |
| | water | 30.38 |

Example 4

70.0 EA/30.0 TMP-1

The polymer dispersion was made exactly the same way as in Example 3 except with different charges as listed in Table 4. The polymer dispersion has a percent solids of 40.3% by weight, an average particle size of 124 nm, and a viscosity of 700 cps (25° C.) at a pH of 6.8.

TABLE 4

| Charges | Reagents | Parts (grams) |
|---|---|---|
| Monomer premix | Water | 15.3 |
| | EA | 504.0 |
| Reactor Charge | Water | 420.6 |
| | Aerosol OT-75 | 7.7 |
| | Carboset ™ GA 2300 | 462.9 |
| | Carboset ™ GA 1166HS | 157.5 |
| | TMP-1 | 216.0 |
| Initiator | APS | 7.2 |
| | Water | 28.87 |
| Post Initiator I | tBHP | 0.51 |
| | SLS | 0.24 |
| | Water | 6.12 |
| Post Initiator II | SFS | 0.58 |
| | water | 30.38 |

Example 5

53.0 nBA/37.0 MMA/10.0 1-OCT

The polymer dispersion was made exactly the same way as in Example 3 except with different charges as listed in Table 5. The polymer dispersion has a percent solids of 46.7% by weight, an average particle size of 111 nm, and a viscosity of 680 cps (25° C.) at a pH of 7.4.

TABLE 5

| Charges | Reagents | Parts (grams) |
|---|---|---|
| Monomer premix | Water | 15.3 |
| | nBA | 381.6 |
| | MMA | 266.4 |
| Reactor Charge | Water | 420.6 |
| | Aerosol OT-75 | 7.7 |
| | Carboset ™ GA 2300 | 462.9 |
| | Carboset ™ GA 1166HS | 157.5 |
| | 1-OCT | 72.0 |
| Initiator | APS | 7.2 |
| | Water | 28.87 |
| Post Initiator I | tBHP | 0.51 |
| | SLS | 0.24 |
| | Water | 6.12 |
| Post Initiator II | SFS | 0.58 |
| | water | 30.38 |

Example 6

56.5 nBA/38.5 MMA/5.0 AO-12

The polymer dispersion was made exactly the same way as in Example 3 except with different charges as listed in Table 6 and the post initiators being metered in over 30 minutes at 65° C. The polymer dispersion has a percent solids of 47.8% by weight, an average particle size of 104 nm, and a viscosity of 560 cps (25° C.) at a pH of 7.8.

TABLE 6

| Charges | Reagents | Parts (grams) |
|---|---|---|
| Monomer premixes | Water | 0 |
| | nBA | 406.8 |
| | MMA | 277.2 |
| Reactor Charge | Water | 411.6 |
| | Aerosol OT-75 | 7.7 |
| | Carboset ™ GA 2300 | 462.9 |
| | Carboset ™ GA 1166HS | 157.5 |
| | AO-12 | 36.0 |
| Initiator | APS | 7.2 |
| | Water | 28.87 |
| Post Initiator I | tBHP | 0.51 |
| | SLS | 0.24 |
| | Water | 30.38 |
| Post Initiator II | SFS | 0.58 |
| | water | 30.38 |

Example 7

53.0 nBA/37.0 MMA/10.0 AO-12

The polymer dispersion was made exactly the same way as in Example 3 except with different charges as listed in Table 7. The polymer dispersion has a percent solids of 47.7% by weight, an average particle size of 97 nm, and a viscosity of 520 cps (25° C.) at a pH of 7.8.

TABLE 7

| Charges | Reagents | Parts (grams) |
|---|---|---|
| Monomer premix | Water | 15.3 |
| | nBA | 381.6 |
| | MMA | 266.4 |
| Reactor Charge | Water | 420.6 |
| | Aerosol OT-75 | 7.7 |
| | Carboset ™ GA 2300 | 462.9 |
| | Carboset ™ GA 1166HS | 157.5 |
| | AO-12 | 72.0 |
| Initiator | APS | 7.2 |
| | Water | 28.87 |
| Post Initiator I | tBHP | 0.51 |
| | SLS | 0.24 |
| | Water | 6.12 |
| Post Initiator II | SFS | 0.58 |
| | water | 30.38 |

Example 8

80.0 nBA/20.0 AO-12

The polymer dispersion was made exactly the same way as in Example 3 except with different charges as listed in Table 8. The polymer dispersion has a percent solids of 46.7% by weight, an average particle size of 142 nm, and a viscosity of 2480 cps (25° C.) at a pH of 7.9.

TABLE 8

| Charges | Reagents | Parts (grams) |
|---|---|---|
| Monomer premix | Water | 15.3 |
| | nBA | 576.0 |
| Reactor Charge | Water | 420.6 |
| | Aerosol OT-75 | 7.7 |
| | Carboset ™ GA 2300 | 462.9 |
| | Carboset ™ GA 1166HS | 157.5 |
| | AO-12 | 144.0 |
| Initiator | APS | 7.2 |
| | Water | 28.87 |
| Post Initiator I | tBHP | 0.51 |
| | SLS | 0.24 |
| | Water | 6.12 |
| Post Initiator II | SFS | 0.58 |
| | water | 30.38 |

Example 9

53.0 EA/37.0 MMA/10.0 AO-16

The polymer dispersion was made exactly the same way as in Example 3 except with different charges as listed in Table 9. The polymer dispersion has a percent solids of 47.9% by weight, an average particle size of 93 nm, and a viscosity of 130 cps (25° C.) at a pH of 6.9.

TABLE 9

| Charges | Reagents | Parts (grams) |
|---|---|---|
| Monomer premix | Water | 15.3 |
| | EA | 381.6 |
| | MMA | 266.4 |
| Reactor Charge | Water | 420.6 |
| | Aerosol OT-75 | 7.7 |
| | Carboset ™ GA 2300 | 462.9 |
| | Carboset ™ GA 1166HS | 157.5 |
| | AO-16 | 72.0 |
| Initiator | APS | 7.2 |
| | Water | 28.87 |
| Post Initiator I | tBHP | 0.51 |
| | SLS | 0.24 |
| | Water | 6.12 |
| Post Initiator II | SFS | 0.58 |
| | water | 30.38 |

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

The invention claimed is:

1. A composite polymer emulsion comprising a composite polymer from polymerizing an aliphatic olefin copolymer in a media containing a support resin, water with a free radical initiator source; said aliphatic olefin copolymer comprising repeating units from a) at least one ethylenically unsaturated aliphatic olefin with 4 to 28 carbon atoms with b) at least one ethylenically unsaturated monomer containing an electron withdrawing group, and c) optionally with other ethylenically unsaturated monomers, the polymerization composite polymer in water being at least partially colloidally stabilized by said support resin, wherein said polymeric support resin comprises i) from about 5 to about 40 wt. % of repeating units derived from acrylic acid or methacrylic acid or ii) from about 10 to about 30 wt. % repeating units from an unsaturated co-polymerizable dicarboxylic acid.

2. The composite polymer emulsion of claim 1, wherein said a) at least ethylenically unsaturated aliphatic olefin has from 4 to 28 carbon atoms and being incorporated as repeating units into said aliphatic olefin copolymer at levels between 5 and 30 wt. %, based on the weight of the aliphatic olefin copolymer and wherein said support resin is present at 20-50 wt. % based on the combined weight of the aqueous phase and said polymeric support resin.

3. The composite polymer emulsion according to claim 1, wherein said b) ethylenically unsaturated monomer containing at least one electron withdrawing group comprises at least one acrylate ester monomer having from 4 to 20 carbon atoms present as repeating units in said aliphatic olefin copolymer in an amount from about 40 to about 90 wt. %.

4. The composite polymer emulsion according to claim 1, wherein said polymeric support resin is present in said composite polymer reaction product in an amount from about 3 to about 60 wt. %, based on the combined weight of said aliphatic olefin copolymer and said polymeric support resin in said composite polymer reaction product.

5. The composite polymer emulsion according to claim 1, wherein said polymeric support resin comprises from about 5 to about 40 wt. % of repeating units derived from acrylic acid or methacrylic acid.

6. The composite polymer emulsion according to claim 2, wherein said polymeric support resin comprises from about 10 to about 30 wt. % repeating units from an unsaturated co-polymerizable dicarboxylic acid.

7. The composite polymer emulsion according to claim 1, wherein at least 10 weight percent of said copolymer has a) at least 5 weight percent polymeric units derived from said at least one ethylenically unsaturated olefin with 4 to 28 carbon atoms, b) at least 10 weight percent repeating units derived from said at least one ethylenically unsaturated monomer containing an electron withdrawing group, and c) at least 5 occurrences in a single copolymer where a polymeric unit from said at least one ethylenically unsaturated aliphatic olefin of 4 to 28 carbon atoms is covalently bonded to a polymeric unit from said at least one ethylenically unsaturated monomer containing an electron withdrawing group.

8. The composite polymer emulsion according to claim 1, wherein said polymeric support resin has a number average molecular weight from about 3000 to about 20,000 Daltons.

9. The composite polymer emulsion according to claim 1, wherein the polymeric support resin becomes self-dispersible in water at a pH of 10 to an extent of at least 5 wt. % in water at 25° C.

10. A process for copolymerizing ethylenically unsaturated aliphatic olefin with ethylenically unsaturated monomer containing an electron withdrawing groups into an aliphatic olefin copolymer comprising:
a) copolymerizing in an aqueous medium using a polymeric support resin to colloidally stabilize the polymerized material, at least one ethylenically unsaturated aliphatic olefin monomer with 4 to 28 carbon atoms with at least one polar ethylenically unsaturated monomer forming a copolymer,
wherein said polymeric support resin comprises i) from about 5 to about 40 wt. % of repeating units derived from acrylic acid or methacrylic acid or ii) from about 10 to about 30 wt. % repeating units from an unsaturated co-polymerizable dicarboxylic acid and has a number average molecular weight from about 3000 to about 20,000 Daltons.

11. The process according to claim 10, wherein said copolymerization involves a free radical as at least part of the propagating species.

12. The process according to claim 11, wherein polymeric units from said at least one ethylenically unsaturated aliphatic olefin monomers with 4 to 28 carbon atoms comprises at least 10 wt. % of the resulting aliphatic olefin copolymer.

13. The process according to claim 12, wherein said at least one polar ethylenically unsaturated monomer comprises at least one acrylate of 4 to 20 carbon atoms, at least 10 wt. % of said at least one ethylenically unsaturated olefin monomers which are co-polymerized are covalently bonded to a polymeric unit from an acrylate monomer in said aliphatic olefin copolymer.

14. The process according to claim 11, wherein at least 50 wt. % of said at least one ethylenically unsaturated aliphatic olefin monomer comprise ethylenically unsaturated aliphatic olefin monomers having from 6 to 15 carbon atoms.

15. The process according to claim 11, wherein said aliphatic olefin copolymer is generally characterized by a number average molecular weight in excess of 10,000 grams/mole as determined by GPC.

16. The process according to claim 11, wherein said aliphatic olefin copolymer is generated in the form of a stable emulsion or dispersion of polymer in an aqueous media.

17. The process according to claim 11, wherein said emulsion or dispersion is characterized by a volume average particle size of less than 1000 nanometers in diameter.

18. An adhesion promoter for adhesives, coatings, and inks, comprising:
a composite polymer according to claim 1, characterized by a number average molecular weight as determined by GPC is at least 10,000 grams/mole.

19. A polymeric reaction product from polymerizing utilizing a polymeric support resin in a media containing water a) at least one ethylenically unsaturated aliphatic olefin with 4 to 28 carbon atoms with b) at least one ethylenically unsaturated monomer containing an electron withdrawing group, and c) optionally with other ethylenically unsaturated monomers forming a copolymer comprising repeating units within the same copolymer from said olefin and said monomer containing an electron withdrawing group, wherein said polymeric support resin comprises i) from about 5 to about 40 wt. % of repeating units derived from acrylic acid or methacrylic acid or ii) from about 10 to about 30 wt. % repeating units from an unsaturated co-polymerizable dicarboxylic acid.

\* \* \* \* \*